United States Patent [19]

Fischer

[11] 4,102,447
[45] Jul. 25, 1978

[54] CLUTCH RELEASE BEARING

[75] Inventor: Wilhelm Fischer, Gochsheim, Fed. Rep. of Germany

[73] Assignee: SKF Kugellagerfabriken GmbH, Schweinfurt, Fed. Rep. of Germany

[21] Appl. No.: 783,063

[22] Filed: Mar. 30, 1977

[30] Foreign Application Priority Data

Mar. 31, 1976 [DE] Fed. Rep. of Germany ....... 2613731

[51] Int. Cl.² ............................................. F16D 69/00
[52] U.S. Cl. ............................................. 192/110 B
[58] Field of Search ............... 192/110 B, 98; 308/233

[56] References Cited

U.S. PATENT DOCUMENTS

| 3,625,327 | 12/1971 | Birdsey | 192/110 B |
| 3,805,934 | 4/1974 | Labadie | 192/110 B X |
| 3,847,258 | 11/1974 | Matyschik | 192/98 |
| 3,882,979 | 5/1975 | Limbacher et al. | 192/110 B X |
| 3,985,215 | 10/1976 | Ernst et al. | 192/110 B X |

Primary Examiner—Edgar W. Geoghegan
Attorney, Agent, or Firm—Daniel M. Rosen

[57] ABSTRACT

A clutch release thrust bearing has an inner rotor disk with an axially extending portion, and a cup-shaped outer disk with an axially extending portion aligned with the axially extending portion of the inner rotor disk. A layer of plastic material is provided on one of the axially extending portions in order to minimize friction between these two members in the event of axial or radial displacement therebetween.

9 Claims, 5 Drawing Figures

Fig. 3.
Fig. 4.
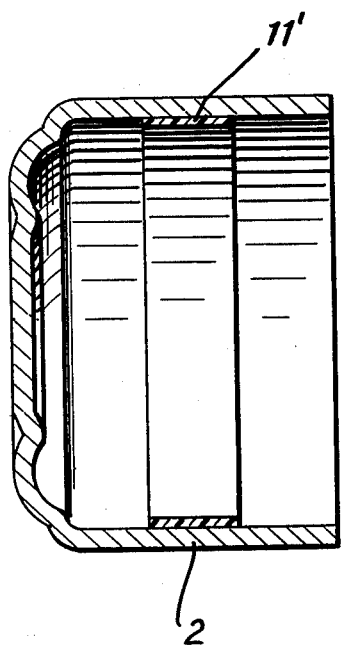
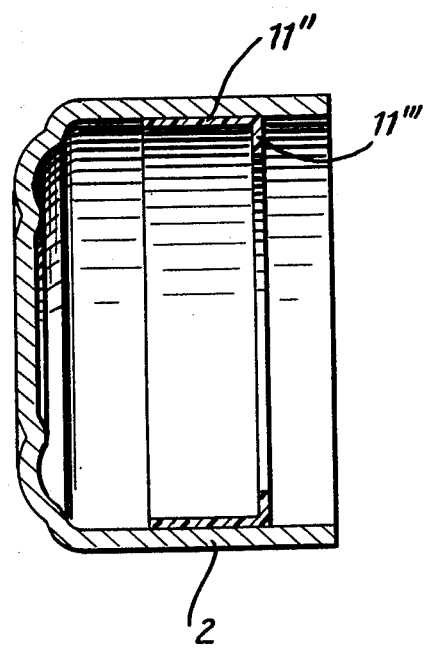

CLUTCH RELEASE BEARING

The present invention concerns a clutch release bearing designed as a thrust bearing, comprising an inner rotor disk that is adapted to be connected to the coupling activating elements, for example, a pressing rod, an outer cup-shaped rotor disk adapted to be acted upon, directly or via a release housing, by a release lever or the like, rolling bodies located in a cage, and a ring pressed into the bore of the outer cup-shaped rotor disk, the ring holding the bearing parts together in one unit. The inner rotor disk, which may be connected to the clutch activating elements has a jacket diameter slightly smaller than the diameter of the bore diameter of the outer cup-shaped rotor disk, according to U.S. patent application Ser. No. 569,189 filed Apr. 17, 1975.

The structure disclosed in the above patent application solves the problem of providing a clutch release bearing that, without special spring elements, inhibits axial displacement of the parts and which, moreover, from the standpoint of functional efficiency is easier to produce. In tests, it has now been found, however, that under certain circumstances, contact of the metallic parts of the two rotor disks can take place. This contact can lead to a somewhat higher friction due to the axial displacement of the two bearing disks during the activation of the coupling. When the bearing disks are made of thin sheet metal, this contact results in the generation of noise during the occurrence of unavoidable shocks in the vehicle. These noises should be avoided, if at all possible.

The present invention is thereby directed to improvements in the bearing described in the above application, that is, to provide a clutch release bearing of the type described above which at all times guarantees exact centering of the two bearing disks with respect to each other, without creating noise and/or wear of the parts which, under certain circumstances, may come into contact with each other.

Briefly stated in accordance with the present invention, by providing a layer of a friction-decreasing material in the gap between the surface of the sleeve of the inner rotor disk and the bore of the outer cup-shaped rotor disk, this layer can substantially, although not completely, fill this gap.

As a result, the inner rotor disk is centered at all times with the minimum possible radial play. This also applies in the case of an axial displacement of the inner rotor disk with respect to the outer cup-shaped rotor disk. This layer of friction-decreasing material, moreover, decreases the friction and also serves as noise insulation in case of contact between the two parts.

The layer can, according to a further feature of the invention, be placed on the sleeve of the inner rotor disk or in the bore of the cup-shaped motor disk. Instead of a layer, a ring or a disk of friction-reducing, or decreasing, material can be used, which is placed or sprayed on the sleeve of the inner rotor disk. Of course, this ring of friction-decreasing material alternatively is mounted in the bore of the outer cup-shaped rotor. Plastic is a good friction-decreasing material. However, it is also possible to use other known friction-decreasing materials.

In order that the invention will be more clearly understood, it will now be disclosed in greater detail with reference to the accompanying drawings, wherein:

FIG. 3 is a cross-sectional view of the outer cup of the bearing in accordance with a further modification of the invention;

FIG. 4 is a cross-sectional view of the outer cup in accordance with a still further modification of the invention.

Figure 1:
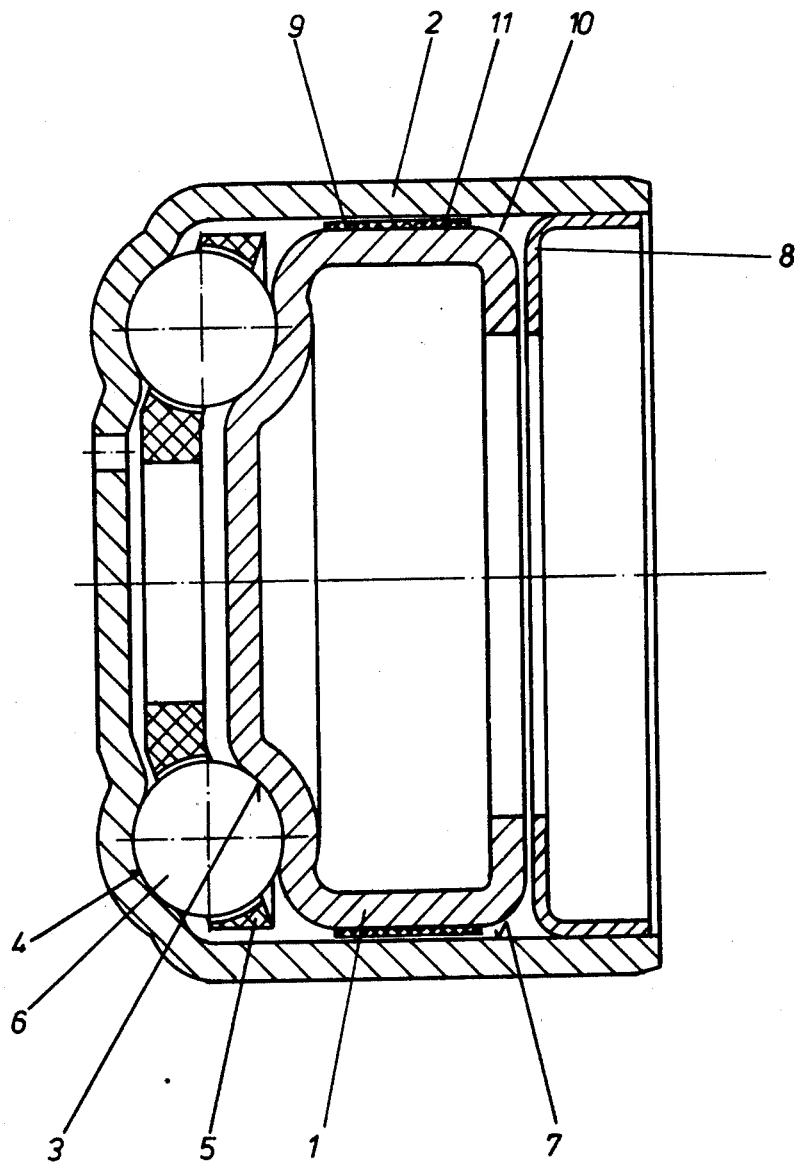
FIG. 1 is a cross-sectional view of a bearing according to the invention, with a cup-shaped inner rotor disk of thin-walled material.

The bearing of FIG. 1 is comprises of an inner rotor disk 1 made of thin-walled material, an outer cup-shaped rotor disk 2, balls 6 in a cage 5 between the tracks 3 and 4 of the inner and outer rotor disks, and an angle ring 8 pressed into the bore 7 of the outer cup-shaped rotor disk 2 for uniting the parts to form an indivisible unit. This portion of the structure is disclosed in FIG. 2 of the above mentioned application.

According to the invention a layer 11 of a friction-decreasing material, for example, plastic, has been placed on the sleeve 9 of the inner rotor disk 1 in the gap 10. This plastic layer centers the rotor disk 1 opposite the rotor disk 2 and reduces the friction between the two rotor disks due to relative movement therebetween.

While layer 11 of friction-decreasing material is stated to substantially completely fill the gap, it will be evident that this refers to the fact that a gap still remains, for example, between the friction-reducing material and the outer cup, whereby the inner disk may rotate freely with respect to the outer disk. The gap, of course, has a minimum radial dimension, whereby a degree of centering is effected in accordance with the principles of the above mentioned patent application, the fricton-reducing layer 11 thereby reducing wear on the bearing structure as well as noise which may occur when the disks are axially displaced and are no longer completely centered by the balls and the effect of the gap during rotation.

Figure 2:
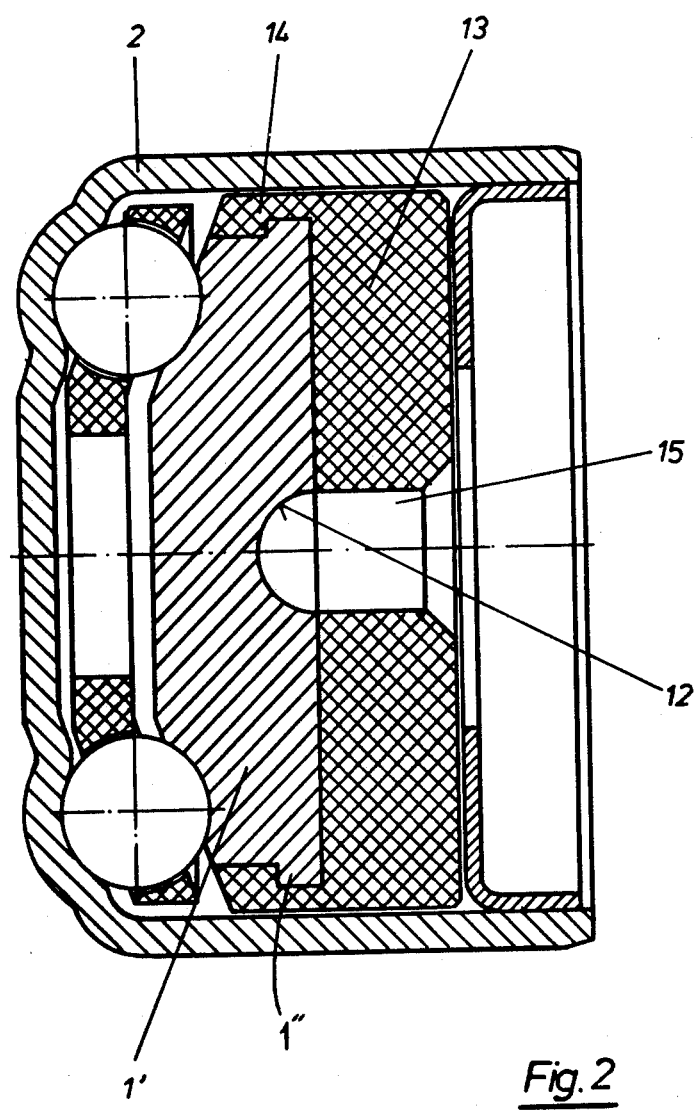
FIG. 2 is a cross-sectional view of a bearing according to the invention with a massive, that is, solid inner rotor disk.

In the example of an embodiment according to FIG. 2 the inner rotor disk 1' is made of massive, that is, solid, material. It has a trough 12 in the center, which is adapted to engage a clutch pusher rod (not shown). The solid inner rotor disk 1' is mounted within an axially extending annular projection 14 from a solid body 13 of friction reducing material, for example, plastic. In this case, the outer circumferential surface of the body 13 as well as the projection 14 thereon define the inner surface of the gap. The inner rotor disk 1' may have an annular outwardly extending projection 1" on its outer surface, engaging a smaller recess in the projection 14 in order to more firmly hold the disk within the body 13. A bore 15 corresponding to the diameter of the pusher rod, is provided in the center of this ring 13. This form of the invention has the advantage that the guide surface for the inner rotor disk 1' in the bore of the outer cup-shaped rotor disk 2 is enlarged so that canting of the rotor disk 1' is avoided. Moreover, the pusher rod is fed into the bore 15 of the ring 13 over a greater distance, so that the axial displacements of the pusher rod with respect to the rotor disk 1' does not exert a negative influence on the functional ability of the bearing.

In the arrangement of the invention illustrated in FIG. 3, the layer 11' of friction-reducing material is placed in contact with the outer ring 2, rather than on the inner disk, as an alternative to the arrangement of FIG. 1. In this embodiment of the invention, the layer 11' may, of course, either be formed as a ring, or a layer formed in another known manner in the outer disk 2. Otherwise, the structure of the bearing in accordance with FIG. 3 is the same as the more completely illustrated bearing of FIG. 1.

In a still further modification of the invention of FIG. 4, the layer of friction-reducing material 11" is also provided within the outer disk 2, in this case the layer 11" being formed as a ring forced into the outer disk. The ring 11" of friction-reducing material has a radially inwardly extending flange 11''' at the open end of the cup-shaped disk 2, for holding the inner rotor disk of the type illustrated in FIG. 1 in position. In this embodiment of the invention, it is apparent that the holding ring 8 of FIG. 1 may be omitted.

Figure 5:
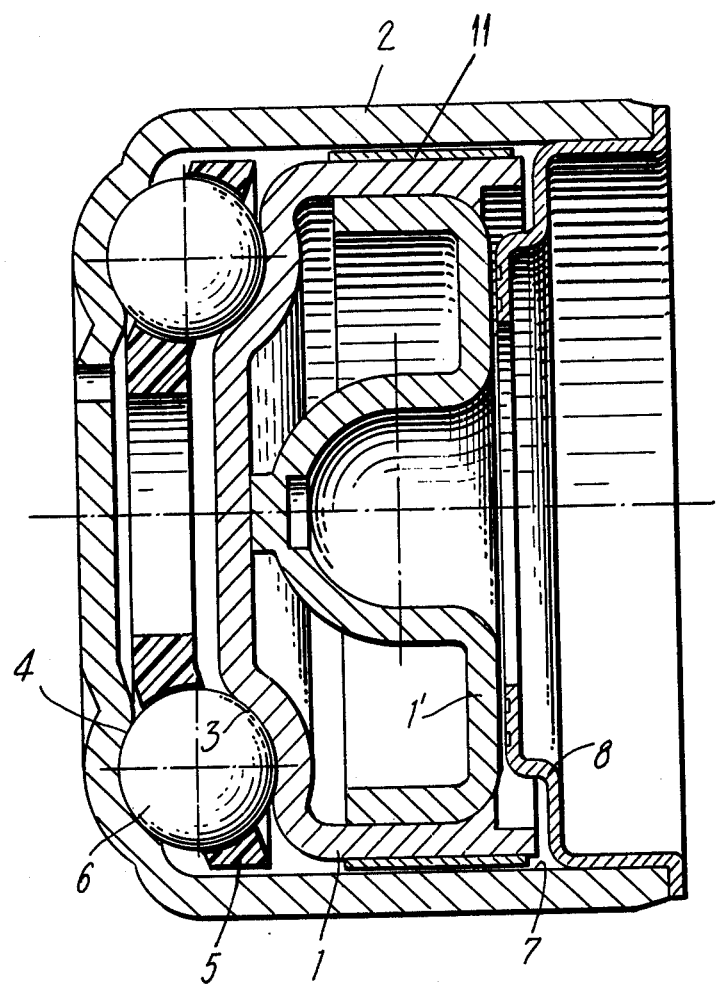
FIG. 5 is a cross-sectional view of another modification of the invention.

While the invention has been disclosed and described with reference to a limited number of embodiments, it will be apparent that variations and modifications may be made therein, within the scope of the invention. For example, the inner rotor disk 1 of the bearing of FIG. 1 may be formed of two parts, such as two telescopic parts 1, 1' as shown in FIG. 5. It is therefore intended in the following claims to cover each such variation and modification as falls within the true spirit and scope of the invention.

What is claimed is:

1. In a clutch release thrust bearing comprising an inner rotor disk, an outer cup-shaped rotor disk, a cage holding rolling elements and positioned axially between said inner and outer disks, and a ring in the bore of the outer disk for holding the elements of the bearing together, the inner and outer disks having aligned axially extending portions defining a narrow annular gap; the improvement comprising a friction-reducing material in said gap on one of said disks and substantially but not completely filling said gap, whereby relative radial displacement of said disks is minimized.

2. The clutch release bearing of claim 1, wherein said friction-reducing material comprises a layer of a friction-reducing material on the outer surface of said inner rotor disk.

3. The clutch release bearing of claim 1, wherein said friction-reducing material comprises a ring of friction-reducing material on the outer surface of said inner rotor disk.

4. A clutch release bearing in accordance with claim 1, further comprising a body of friction-reducing material axially adjacent said inner rotor disk, said body having an axially extending annular projection radially surrounding said inner rotor disk.

5. The clutch release bearing of claim 4, wherein said body has a central bore for receiving a pusher rod of a clutch.

6. The clutch release bearing of claim 1, wherein said friction-reducing material comprises a layer of friction-reducing material within the bore of said outer rotor disk.

7. The clutch release bearing of claim 6, wherein said layer of friction-reducing material comprises a ring of friction-reducing material placed and secured in the bore of said outer rotor disk.

8. The clutch release bearing of claim 7, wherein said ring has a radially inwardly directed projection defining said ring for holding said elements together.

9. The clutch release bearing of claim 8, wherein said friction-reducing material is a plastic material.

* * * * *

UNITED STATES PATENT AND TRADEMARK OFFICE
CERTIFICATE OF CORRECTION

PATENT NO. : 4,102,447
DATED : July 25, 1978
INVENTOR(S) : Wilhelm Fischer

It is certified that error appears in the above-identified patent and that said Letters Patent are hereby corrected as shown below:

Column 2, line 12; Change "comprises" to -- comprised --,

Signed and Sealed this

Sixth Day of February 1979

[SEAL]

Attest:

RUTH C. MASON
Attesting Officer

DONALD W. BANNER
Commissioner of Patents and Trademarks